United States Patent Office 2,746,933
Patented May 22, 1956

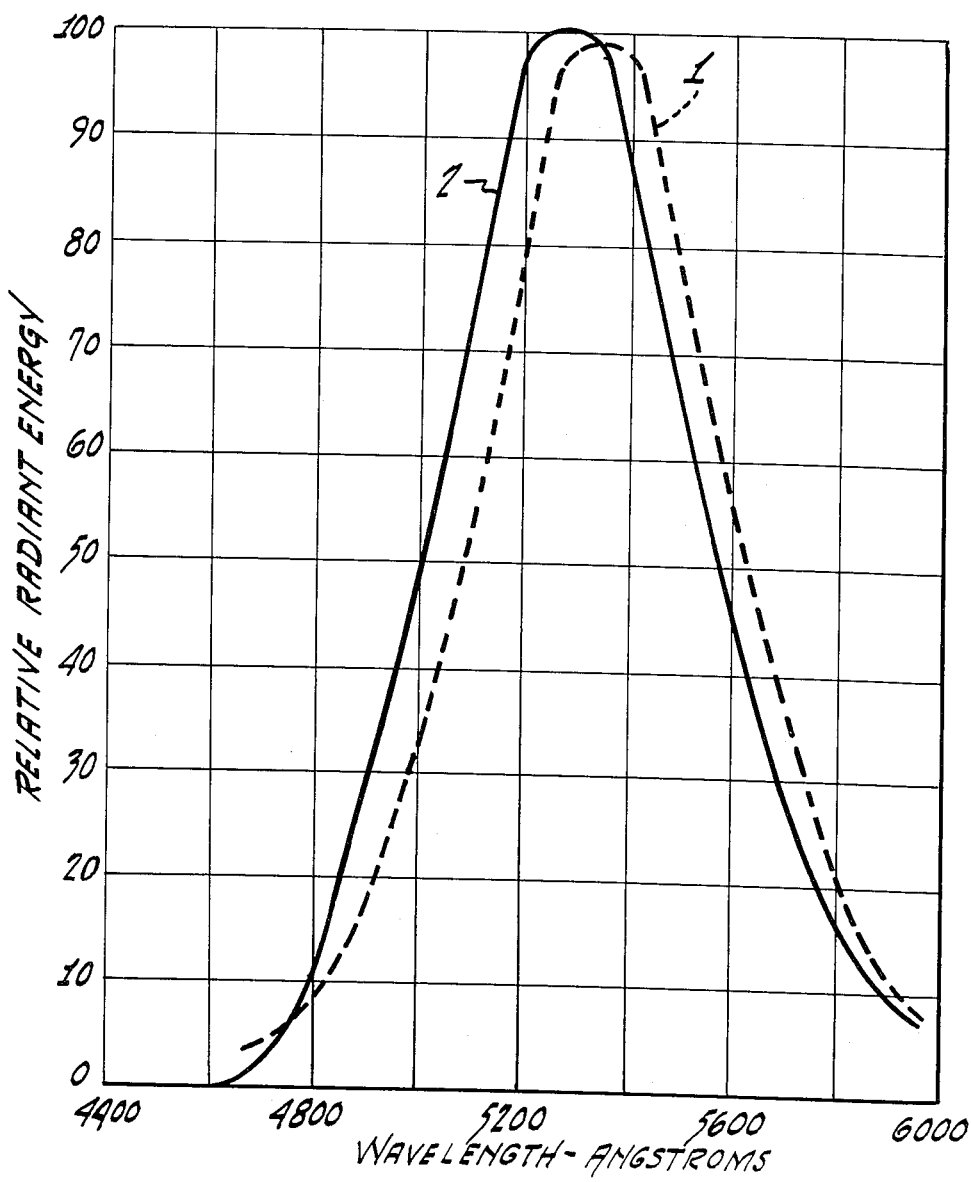

2,746,933

FLUORIDE PHOSPHORS

Arthur L. J. Smith, Lancaster, Pa., assignor to Radio Corporation of America, a corporation of Delaware Application April 28, 1953, Serial No. 351,595

7 Claims. (Cl. 252—301.4)

This invention relates to improved phosphor materials and to improvements in the method of making the materials. More particularly, the invention relates to improved fluoride phosphors and to improved methods of preparation of these fluorides.

Many types of phosphors have been proposed for use in cathode ray tubes and luminescent lamps, the principal requirement being high fluorescence efficiency under electronic, ionic or radiant energy excitation. Desirable spectral distribution of luminescence is also an important requirement for phosphors used in this type of apparatus. Aircraft position and indicating equipment utilizes cathode ray tubes in which the luminescent screens are composed of phosphors having relatively long decay periods as well as suitable luminescence intensity. In this type of equipment, it is required, for example, to trace the trajectory of an approaching aircraft on the screen of a cathode ray tube and have this trajectory visible as a phosphorescing trace for a relatively long period of time. In such radar systems, the beam of the cathode ray tube is sequentially pulsed to form on the screen a phosphorescent light trace representing the trajectory of the aircraft.

Accordingly, an object of this invention is to provide a novel luminescent material which will emit light of high intensity under cathode ray bombardment.

Another object is to provide a new luminescent material of which the spectral emission and persistence of emission may be varied over a range by varying one or more components of the material.

In general, the invention lies in the preparation of an improved phosphor comprising a manganese activated combination of calcium fluoride ($CaF_2$) and aluminum fluoride ($AlF_3$).

The invention will be described in greater detail by reference to the accompanying drawing in which the single figure is a family of graphs illustrative of the operating characteristics of preferred embodiments thereof.

The preparation of a phosphor in accordance with the present invention having the composition $CaF_2.AlF_3:Mn$ is preferably accomplished as follows: One mole of anhydrous calcium fluoride, one mole of anhydrous aluminum fluoride and .02 mole of anhydrous manganese fluoride are mixed in the dry state and ground to a fine powder in preparation for firing. The firing step is accomplished in a neutral or reducing atmosphere at a temperature of 800° C. The preferred procedure comprises firing the sample first for one-half hour, re-grinding the fired material, then firing for one-half hour, re-grinding and, finally, firing for a third half-hour. Such a procedure facilitates the reaction of the substances involved and provides a higher quality and more homogeneous end product. This procedure also has the advantage of being fast and not particularly critical. To insure against oxidation during firing, the sample is fired in a double container or crucible. An inner container holding the sample preferably is of platinum and has a platinum lid. The outer container may also be of platinum and is provided with a tight-fitting lid. Carbon is generally placed in the outer container to further insure against oxidation of the sample.

The product resulting from the above-described process is a homogeneous, fine-particle, soft powder which has a green emission with a peak at 5250 Angstroms. Such a phosphor is particularly suitable for use in electron devices employed in radar or similar systems.

Although the foregoing method for preparing $$CaF_2AlF_3:MnF_2$$

is the preferred method, variations in some of the steps are possible. For example, the firing temperature of the mixed sample may be within the range of 700° C. to 1000° C. and the firing may be accomplished in a single step lasting from approximately 20 minutes to approximately 12 hours, with the shorter times accompanying the higher temperatures.

Other methods of providing a non-oxidizing atmosphere may be used. For example, firing may take place with the crucibles surrounded by an inert or slightly reducing gas. In addition, carbon crucibles may be employed to hold the sample during firing.

In an alternative method of preparing a manganese activated calcium fluoride-aluminum fluoride phosphor, either the carbonates, oxides or hydroxides of calcium and aluminum in the proper ratios and with the requisite amount of manganese activator are slurried with water to make a thin paste. One member of the group consisting of hydrofluoric acid, ammonium fluoride or ammonium bifluoride are added to the paste in slight excess of that required to convert the carbonates, oxides or hydroxides to the respective fluoride. The mixture is then carefully evaporated to dryness by heating at a temperature in the range of 110° C.–150° C. The dried material is then heated in a non-oxidizing atmosphere at 500° C. to dispel any hydrofluoric acid or ammonium fluoride remaining therein. Next, the firing procedures described above may be employed to obtain the final phosphor material. This method has the advantage of providing a highly uniform phosphor material.

The calcium-aluminum fluoride phosphors of the invention have the following formula: $xCaF_2.yAlF_3:zMn$ wherein, $x+y=1$ (mole) and $x$ has values in the range of 0.99 to 0.1 mole and $y$ has values in the range of 0.01 to 0.9 mole; and for one mole of phosphor $z$ may have a value in the range of 0.001 to 0.1 mole with 0.02 mole being a preferred value. The manganese activator may be present as a fluoride, chloride, sulfate or as any other suitable salt. The preferred activator is $MnF_2$.

The following are some of the phosphor compositions and their peak emissions which have been obtained:

| Molar Composition | Peak Emission |
|---|---|
| 0.9 $CaF_2$—0.1 $AlF_3$ | 4,950–5,250 |
| 0.8 $CaF_2$—0.2 $AlF_3$ | 4,950–5,380 |
| 0.7 $CaF_2$—0.3 $AlF_3$ | 4,950–5,380 |
| 0.6 $CaF_2$—0.4 $AlF_3$ | 5,380 |
| 0.5 $CaF_2$—0.5 $AlF_3$ | 5,380 |
| 0.3 $CaF_2$—0.7 $AlF_3$ | 5,250 |
| 0.2 $CaF_2$—0.8 $AlF_3$ | 5,250 |
|  | 5,250 |

In preparing these phosphors and others not listed but included in the general formula, the compositions at the extremes, i. e., those having substantially more of one component than the other, are fired at the extremes of the 700° C. to 1000° C. temperature range. Those phosphors in the middle of the range of molar compositions are fired in the middle of the temperature range.

Of the various phosphors prepared by mixing various molar combinations of $CaF_2$ and $AlF_3$ in accordance with the above-mentioned general formula, X-ray and emission studies seem to indicate that three distinct phosphors, which may be compounds, are formed. These are 0.6 $CaF_2$.0.4 $AlF_3$ having a peak emission at 5380 Angstroms, 0.5 $CaF_2$.0.5 $AlF_3$ having a peak emission at 5250 Angstroms, and 0.3 $CaF_2$.0.7 $AlF_3$ having a peak emission at 5250 Angstroms. Emission curves 1 and 2 for the first two compositions respectively are shown in Figure 1.

What is claimed is:

1. A luminescent material having the formula $$xCaF_2.yAlF_3:zMn$$

where $x+y=1$ (mole) and $x$ may have values in the range of 0.99 to 0.1 mole and $y$ correspondingly may have values in the range of 0.01 to 0.9 mole; and for one mole of phosphor $z$ may have a value in the range of .001 to 0.1 mole.

2. A luminescent material having the molar composition: 0.5 $CaF_2$.0.5 $AlF_3$:0.02 $MnF_2$.

3. A luminescent material having the molar composition: 0.7 $CaF_2$.0.3 $AlF_3$:0.02 $MnF_2$.

4. A luminescent material having the molar composition: 0.33 $CaF_2$.0.66 $AlF_3$:0.02 $MnF_2$.

5. A method of preparing a manganese activated calcium aluminum fluoride phosphor material comprising the steps of preparing a mixture in the proportion of $x$ moles of calcium fluoride, $y$ moles of aluminum fluoride and $z$ moles of manganous fluoride, wherein $x$ may have values between 0.1 and 0.99, $y$ may have values between 0.01 and 0.9, $z$ may have values between 0.001 and 0.1 and $x+y=1$; grinding said mixture; and firing said mixture in a nonoxidizing atmosphere at a temperature in the range of 700° C. to 1000° C. for a time in the range of 20 minutes to 12 hours.

6. A method of preparing a manganese activated calcium aluminum fluoride phosphor material comprising the steps of preparing a mixture of in the proportion of $x$ moles of calcium fluoride, $y$ moles of aluminum fluoride and $z$ moles of manganous fluoride, wherein $x$ may have values between 0.1 and 0.99, $y$ may have values between 0.01 and 0.9, $z$ may have values between 0.001 and 0.1 and $x+y=1$; grinding said mixture; firing said ground mixture for one-half hour at 800° C. in a non-oxidizing atmosphere; re-grinding said fired mixture; firing said reground mixture for a second one-half hour at 800° C. in a non-oxidizing atmosphere; grinding said fired mixture; and firing said mixture for one-half hour at 800° C. in a non-oxidizing atmosphere.

7. The method of preparing a phosphor material comprising the steps of mixing in the proportion of $x$ moles of a first constituent comprising one member of the group consisting of calcium carbonate, calcium oxide and calcium hydroxide with $y$ moles of a second constituent comprising one member of the group consisting of aluminum carbonate, aluminum oxide and aluminum hydroxide and $z$ moles of a manganese activator, wherein $x$ may have values between 0.1 and 0.99, $y$ may have values between 0.01 and 0.9, $z$ may have values between 0.001 and 0.1 and $x+y=1$ with water to form a thin paste; adding a third constituent comprising one member of the group consisting of hydrofluoric acid, ammonium fluoride, and ammonium bifluoride in an amount in slight excess of that required to convert said first and second constituents to fluorides; heating the mixture of constituents to dryness at a temperature in the range of 110° to 150° C.; heating said mixture in a non-oxidizing atmosphere at 500° C. to dispel any of said third constituent remaining; grinding said mixture; and firing said mixture in a non-oxidizing atmosphere at a temperature in the range of 700° C. to 1000° C. for a time in the range of 20 minutes to 12 hours.

References Cited in the file of this patent

FOREIGN PATENTS 579,749     Great Britain _____ Aug. 14, 1946